United States Patent [19]
Gorski et al.

[11] Patent Number: 4,971,712

[45] Date of Patent: Nov. 20, 1990

[54] COMPOSITIONS FOR COMPRESSION REFRIGERATION AND METHODS OF USING THEM

[75] Inventors: Robert A. Gorski, Newark, Del.; William L. Brown, Pleasantville, N.Y.

[73] Assignee: E. I. Du Pont de Nemours and Company, Wilmington, Del.

[21] Appl. No.: 360,984

[22] Filed: Jun. 2, 1989

[51] Int. Cl.$^5$ ............... C10M 141/02; C10M 141/04
[52] U.S. Cl. .................. 252/52 A; 252/56 R; 252/68; 252/69
[58] Field of Search ............ 252/52 A, 56 R, 68, 252/69

[56] References Cited

U.S. PATENT DOCUMENTS

| | | | |
|---|---|---|---|
| 4,248,726 | 2/1981 | Uchinuma et al. | 252/68 |
| 4,267,064 | 5/1981 | Sasaki et al. | 252/68 |
| 4,428,854 | 1/1984 | Enjo et al. | 252/69 |
| 4,755,316 | 7/1988 | Magid et al. | 252/68 |

*Primary Examiner*—Jacqueline V. Howard

[57] ABSTRACT

A blend of a tetrafluoroethane or pentafluoroethane refrigerant with a mono-functional random polyalkylene glycol based on significant amounts of ethylene oxide and propylene oxide and having an SUS viscosity at 100° F. of 100 to 1200 is disclosed for use in compression refrigeration.

13 Claims, No Drawings

COMPOSITIONS FOR COMPRESSION REFRIGERATION AND METHODS OF USING THEM

FIELD OF THE INVENTION

This invention relates to lubricants used with refrigerants in compression refrigeration and air-conditioning systems. More particularly, it relates to lubricants for use with tetrafluoroethanes, e.g. 1,1,1,2 - Tetrafluoroethane (HFC-134a ), and 1,1,2,2 - Tetrafluoroethane (HFC-134), and of lesser importance, pentafluoroethane (HFC-125). These refrigerants are being considered as replacements for dichlorodifluoromethane (CFC-12), particularly in automotive air conditioning systems.

BACKGROUND OF THE INVENTION

Refrigeration systems that use CFC-12 as the refrigerant generally use mineral oils to lubricate the compressor. (See for example the discussion in Chapter 32 of the 1980 ASHRAE Systems Handbook.) CFC-12 is completely miscible with such oils throughout the entire range of refrigeration system temperatures, i.e. $-45°$ C. to 65° C. In automotive air-conditioning, paraffinic and naphthenic oils of about 500 SUS viscosity at 100° F are used with CFC-12. These oils have "pour points" below $-20°$ C. and are completely miscible with the CFC-12 refrigerant over the range of temperatures from $-10°$ C. to 100° C. Consequently, oil which dissolves in the refrigerant travels throughout the refrigeration loop in the air conditioning system and returns with the refrigerant to the compressor. It does not separate during condensation, although it may accumulate because of the low temperature when the refrigerant is evaporated. At the same time, this oil which lubricates the compressor will contain some refrigerant which, in turn, may affect its lubricating properties.

When substituting HFC-134a or HFC-134 for CFC-12 in these refrigeration systems, it would be desirable to be able to use the same mineral oils as used with CFC-12. It would not require any substantial change in equipment nor any significant changes in conditions used for the system. If lubricant separates from refrigerant during operation of the system, serious problems may result, i.e. the compressor could be inadequately lubricated. This would be most serious in automotive air-conditioning systems because the compressors are not separately lubricated and a mixture of refrigerant and lubricant circulates throughout the entire system. Unfortunately, however, the mineral oils are substantially immiscible with the tetrafluoroethanes.

Two recent publications of ASHRAE discuss the problems associated with separation of lubricants and refrigerants. These are "Fundamentals of Lubrication in Refrigerating Systems and Heat Pumps" Kruse and Schroeder ASHRAE Transactions Vol. 90 Part 2B, pps. 763–782, 1984 and "Evaluation of Lubricants for Refrigeration and Air-Conditioning Compressors" Spauschus ibid pps. 784–798.

In summary, refrigerants which are not completely miscible with an oil in the full range of mixture compositions and operating temperatures may become miscible or immiscible as the temperature is raised or lowered from room temperature. The areas of immiscibility may assume a variety of shapes, i.e. parabolic or non-parabolic. As a parabola, the curve of miscibility temperature vs. percent oil in the mixture, may have its open or concave portion facing the low or high temperatures. The closed or convex portion of the parabolic curve identifies, respectively, the maximum or minimum temperature above or below which the refrigerant and the lubricating oil are completely miscible. These temperatures are referred to as the maximum or minimum "consolute temperatures." Besides parabolas, these curves can assume skewed parabolic shapes or curves of varying slope wherein immiscibility occurs above or below the curve.

One of the objects of this invention is to provide a combination of lubricating oil and tetrafluoroethane, e.g. HFC-134a, where the area of miscibility encompasses the full ranges of temperature and composition encountered in compression refrigeration, i.e. complete miscibility occurs for all compositions in the range of $-45°$ C. to at least 20° C. Another object is to provide a process for using such compositions in compression refrigeration.

Prior Art

U.S. Pat. No. 4,248,726, issued Feb. 5, 1981, and U.S. Pat. No. 4,267,064, issued May 12, 1981, both to Nippon Oil Co. et al, relate to the use of a polyglycol oil such as polyoxypropylene glycol (or an alkyl ether thereof) having a viscosity index of at least 150 and a glycidyl ether type epoxy compound as a high viscosity refrigeration oil composition for halogen-containing refrigerants. These polyglycol/glycidyl ether compositions are disclosed for use with Freon ® 11, 12, 13, 22, 113, 114, 500 and 502; and as being "particularly effective" with Freon ® 2 or 22.

Research Disclosure 17486 entitled "Refrigeration Oil" by E. I. du Pont de Nemours & Co. discloses polyalkylene glycols such as "Ucon" LB-165 and "Ucon" LB-525 sold by Union Carbide Corporation, for use with HFC-134a. These glycols are polyoxypropylene glycols that are mono-functional and are prepared from propylene oxide initiated with n-butanol. The publication states that these combinations of oil and refrigerant are miscible in all proportions at temperatures at least as low as $-50°$ C. and are thermally stable in the presence of steel, copper and aluminum at 175° C. for about six days.

U.S. Pat. No. 4,755,316, issued July 5, 1988, to Allied-Signal Inc. also relates to the use of polyalkylene glycols. However, these glycols are at least difunctional with respect to hydroxyl groups and contain at least 80% propylene oxide units relative to the total, the remaining 20% may derive from ethylene or butylene oxide or esters, olefins and the like which are polymerizable with propylene oxide. It should be noted that only 100% oxypropylene units in the difunctional PAG's are exemplified in this patent.

SUMMARY OF THE INVENTION

The present invention is based on the discovery that the use of a sufficient amount to lubricate, usually 10-20% by volume for automotive use, but in some situations as high as 50% by volume, of at least one mono-functional random polyalkylene glycol (PAG), also referred to as polyoxyalkylene glycol, based on a significant amount of ethylene oxide and propylene oxide, preferably from 25%–75% ethylene oxide and, correspondingly, 75%–25% propylene oxide, will be completely miscible with tetrafluoroethane and pentafluoroethane, usually 80-90%, sometimes as much as 50-90% by volume of the tetrafluoroethanes, e.g., HFC-134 and HFC-134a, or pentafluoroethane, HFC-125, or blends thereof with each other and with other refrigerants in the range of temperatures from −40° C. to at least 20° C. The more preferred weight per cents of oxypropylene units and oxyethylene units in the random PAG are from 40-60% to 60-40%, respectively; and the most preferred ratio is about 50:50. The weight ratio of refrigerant to the PAG lubricant in the mixtures used for refrigeration may be anywhere from 99/1 to 1/99, preferably 99/1 to 70/30. The viscosities of these oils may be anywhere from 100 to 1200 SUS and for most commercial uses, from 400 to 1000 SUS.

The process of manufacturing these mono-functional PAGs may involve initiation with methanol, ethanol, propanol or butanol. The last mentioned, butanol, is the preferred initiator; and the process of manufacture is described in the Encyclopedia of Polymer Science and Engineering, Volume 6, pps. 225–273; "Ethylene Oxide Polymers and Copolymers" by Clinton and Matlock, 2nd edition, 1986, John Wiley & Sons.

It has also been found that the use of 0.1–1.3% of an "extreme pressure (EP) additive" improves the lubricity and load-bearing characteristics of the oil and thus improves the quality of the refrigerant-lubricant compositions of this invention. EP additives for use in the invention are included among these disclosed in Table D of U.S. Pat. No. 4,755,316. The preferred ones are the organic phosphates and include Lubrizol ® 1097, a zinc (dialkyl dithio) phosphate manufactured by the Lubrizol Corporation; and SYN-O-AD ® 8478, a 70%/30% blend of tri (2,4,6-tri-t-butyl phenyl) phosphate/triphenyl phosphate manufactured by the Stauffer Chemical Company.

EP additives may also be used in conjunction with some of the oxidation and thermal stability improvers and/or corrosion inhibitors also disclosed in Table D of U.S. Pat. No. 4,755,316. Such a preferred blend of additives is MLX-788, a proprietary mixture of Union Carbide Corporation containing a phosphate and two amine-containing compounds.

DESCRIPTION OF PREFERRED EMBODIMENTS

As stated previously, the tetrafluoroethanes, e.g., HFC-134a, and HFC-134 and pentafluoroethane, HFC-125, particularly HFC-134a, have physical characteristics which allow substitution for CFC-12 with only a minimum of equipment changes in compression refrigeration. They could be blended with each other, as well as with other refrigerants including CFC-12($CCl_2F_2$), HCFC-22($CHClF_2$), HFC-152A($CH_3CHF_2$), HCFC-124($CHClFCF_3$), HCFC-124a($CHF_2CClF_2$), HCFC-142b($CH_3CClF_2$), HFC-32($CH_2F_2$), HFC-143a($CH_3CF_3$), HFC-143($CHF_2CH_2F$), HFC-125($CF_3CHF_2$) and FC-218($CF_3CF_2CF_3$); and for purposes of the present invention such blends are not excluded. However, only those blends of tetrafluoroethane with other refrigerants which are miscible with the lubricants of this invention in the range of −40° C. to at least +20° C. are included.

HFC-134a, the preferred tetrafluoroethane refrigerant, may be prepared by any of the methods disclosed in the prior art; e.g., U.S. Pat. Nos. 2,745,886; 2,887,427; 4,129,603; 4,158,675; 4,311,863; 4,792,643, and British Nos. 1,578,933 and 2,030,981, which are incorporated herein by reference.

The most preferred mono-hydroxyl polyalkylene glycol for use in this invention is based on the random polymerization of a 50/50 weight percent mixture of ethylene oxide and propylene oxide initiated with n-butanol. Although the amount of ethylene oxide can preferably range from 25 to 75 weight % of the ethylene oxide/propylene oxide composition and the viscosity can range from about 100 to 1200 SUS viscosity at 100° F., preferably 400 to 1200 SUS, the most preferred PAG's are the "50HB400" to "50HB660" ("400" and "660" representing the SUS viscosity at 100° F.; "H" representing "hydrophyllic"; "B" representing the butanol initiator; and "50" indicating the presence of 50% ethylene oxide units) that are manufactured by the Union Carbide Corporation. The process of their manufacture is described in the 1986 edition of the Encyclopedia of Polymer Science and Engineering.

Although the preferred 50HB500 oil is not completely miscible with HFC-134a at condenser temperatures above 50° C., it meets the miscibility requirement to 40° C. and all the other requirements for automotive air conditioning. Its viscosity index, pour point, stability, lubricity, and miscibility with HFC-134a down to −50° C. are quite satisfactory. Furthermore, the use of an extreme pressure oil additive such as those mentioned previously improves the bearing-wear and load-carrying capability significantly.

Specifically, the lubricants used in the compositions of this invention, and in the invented method for providing of lubrication in compression refrigeration and air-conditioning equipment have the following characteristics:

Viscosity at 100° F.

100 to 1200 SUS, preferably 400 to 1200 SUS, most preferably 500 SUS for automotive air-conditioning;

Viscosity index

>90, preferably 150 to 250 or higher;

Pour point

<20° C. preferably −20° C. to about −50° C. and −33° C. for the 100 SUS and 1200 sus oils, respectively;

Solubility or miscibility range

100% from at least 20° C. to less than −10° C. for 1-99 weight percent of HFC-134a in mixture with the lubricant;

Four-ball wear test with a specific set of steel balls; Scar wear and coefficient of friction equal to or less than that for the oils currently used with CFC-12 in automotive air-conditioning, i.e., 0.37 mm scar wear and 0.07 friction coefficient when saturated with CFC-12 at atmospheric pressure;

"Falex" load-failure test with a specific type of steel for the V-block and pin; the fail load equal to or greater than that for the CFC/refrigerant oil combinations, i.e., 1300 lbs. when saturated with CFC-12 at atmospheric pressure.

1. Solubility of Refrigerant in Lubricants

Six ml. blends of refrigerant and lubricant were used for the solubility studies. Generally, the mixtures contained 30, 60 and 90 wt. % refrigerant. In some instances, more compositions were made to better define the miscible/immiscible region. These air-free mixtures were contained in sealed Pyrex ® tubes (7/16″ I.D.×5.5″, ca. 12.5 cc capacity). The refrigerant/lubricant solubilities were determined by completely immersing the tube in a bath at each test temperature for a minimum of 15 minutes and providing agitation to facilitate mixing and equilibration. The accuracy of determining the temperatures where the refrigerant/lubricant blend became either miscible or immiscible was about ±2° C. The refrigerant/lubricant blends were called immiscible when the blend acquired and retained "schlieren" lines; became hazy or cloudy; formed floc; or formed two liquid layers.

2. Stability of Refrigerant and Lubricant

Three ml. of refrigerant and 0.3 ml. of lubricant plus three metal coupons (steel 1010/copper/aluminum 1100—2⅜"×¼"×1/16", 120-grit surface finish) were charged and sealed in a Pyrex® tube (7/16" I.D.×5.5", ca. 12.5 cc volume) under anaerobic conditions. The specimens were tied together at the top end with copper wire, with copper-wire rings between the metals to separate the metals at the top end. The tubes were stored vertically at 268° C. for 11.8 days. Afterwards, the tube contents were examined for appearance changes. The refrigerants were then transferred to gas-sampling bulbs for analysis by gas chromatography for the decomposition products of the refrigerant i.e., HFC-143 (the decomposition product of HFC-134a) or for HCFC-22 (CFC-12 decomposition product). These results were then converted to their equivalents in terms of HF and HCl generated.

3. Lubricity a. Four-ball Wear Test

The procedure is described fully in ASTM D4172. The method was modified as follows: A load of 20 Kg at 1200 RPM was put on the steel 52100 balls immersed in 10 ml. of lubricant. The refrigerant, HFC-134a or CFC-12, was bubbled through a Teflon® capillary tube into the lubricant at the rate of 0.75 standard cu. ft./hr. to provide one atmosphere of pressure of refrigerant gas over the lubricant and a gas-saturated lubricant.

b. Falex Pin/V-Block Load-to-Failure Test

The procedure is described fully in ASTM D3233. The V-Block was made of AISI C-1137 steel (HRC-20 to 24 hardness, 5 to 10 microinches surface finish). The test pin was made of AISI 3135 steel (HRB-87 to 91 hardness, 5 to 10 microinches surface finish). These tests were also run with refrigerant gas bubbling through the oil as in the four-ball wear test.

4. Viscosity and Viscosity Index a. Viscosity is a property that defines a fluid's resistance to shearing force. It is expressed in terms of absolute viscosity, kinematic viscosity or Saybolt Seconds Universal viscosity (SSU), depending on the method by which it is determined. Conversion from SSU to mm²/s (centistokes) can be readily made from tables contained in ASTM D-445, but it is necessary to know the density to convert kinematic viscosity to absolute viscosity. Refrigeration oils are sold in viscosity grades, and ASTM has proposed a system of standardized viscosity grades for industry-wide usage (D-2422).

b. Viscosity Index is a measure of the amount of change experienced by an oil with temperature. Viscosity decreases as the temperature increases and increases as the temperature decreases. The relationship between temperature and kinematic viscosity is represented by:

$$\log \log (v+0.7) = A + B \log T$$

where
v = kinematic viscosity, mm²/s (CST)
T = thermodynamic temperature (kelvin)
A,B = constants for each oil This relationship is the basis for the viscosity temperature charts published by ASTM and permits a straight line plot of viscosity over a wide temperature range. This plot is applicable over the temperature range in which the oils are homogeneous liquids.

The slope of the viscosity-temperature lines is different for different oils. The viscosity-temperature relationship of an oil is described by an empirical number called the Viscosity Index (VI) (ASTM D-2270). An oil with a high viscosity index (HVI) shows less change in viscosity over a given temperature range than an oil with a low viscosity index (LVI).

5. Pour Point

Any oil intended for low temperature service should be able to flow at the lowest temperature likely to be encountered. The procedure for determining pour point is described in ASTM D-97.

The invention will be more clearly understood by referring to the following experiments which are presented in Tables I–XI.

1. Solubility Data

Tables I and II summarize the solubility data for the mono-functional random polyalkylene glycol-tetrafluoroethane refrigerant compositions of this invention. The PAG's contained 25-75% ethylene oxide units and, correspondingly 75-25% propylene oxide units and their preparation involved butanol and methanol initiators.

The solubility data indicate that the PAG's used in the invention provided superior results when compared at equivalent viscosities, to:
(1) mono-functional PAG's containing 100% propylene oxide units as shown in Table III.
(2) PAG's with less than one —OH group as shown in Table IV.
(3) the PAG with two -OH groups as shown in Table V.
(4) PAG's with three -OH groups, three of which were initiated with glycerine (G) as shown in Table VI.

In Table VII, data showing the immiscibility of HFC-134a with those oils typically used with CFC-12 in automotive air-conditioning, e.g. paraffinic (BVM-100N) and naphthenic (Suniso 5GS), as well as other alternative oils, are presented.

2. Stability Data

The stability of compositions of HFC-134a with the PAG's used in this invention are significantly better than that of the compositions of CFC-12 with the oils currently used in automotive air-conditioning as shown in Table VIII. The tests in Table VIII approximate the results obtained after operating an automobile for ten (10) years.

3. Additives for the PAG's used in this invention

It is known in the state of the art that additives may be used in lubricants to enhance its performance. These additives may include any one or combination of the following to meet the specific functional requirements for the types of compressor employed: extreme pressure additive, anti-wear additive, antioxidant, high-temperature stabilizer, corrosion inhibitor, detergent and anti-foaming agent. Although all of these additives are not used in these experiments, they are not meant to be excluded as additives for the PAG's especially if they are not significantly detrimental to the solubility of the HFC-134a in the PAG's.

EP additives alone and in combination with other additives, which are soluble in the 50HB PAG's are shown in Table IX. The superiority of the lubricity of the 50HB500/HFC-134a with and without the additive package over the naphthenic and paraffinic oils currently used in automotive air-conditioning is shown in the four-ball wear tests (Table X). The real advantage that the additive package gives to the oil is shown in the load-to-failure test (Table XI).

As a supplement to the above additives, blends of the low and high viscosity 50HB PAG's may also be used to enhance the lubricating quality for the oil under a variety of compressor requirements. Blends of the 50HB PAG's may also be made with other PAG's (0,1,2,3,etc functional groups) to meet special lubrication needs.

The tables, referred to in the foregoing paragraphs, are presented hereinafter.

TABLE I

Solubility of Refrigerant (HFC-134a) with Lubricant
(PAG containing one functional - OH group)
(Test Range: 93 to −50° C.)

| Expt. No. | Lubricant* | Miscible Range (°C.) For Indicated Concentrations of HFC-134a In Oil (Wt. %) | | |
|---|---|---|---|---|
| | | 30% | 60% | 90% |
| 1. | 50HM350 | 93 to −50 | 60 to −50 | 51 to −50 |
| 2. | 75HB350 | 93 to −10 | 69 to −50 | 44 to −50 |
| 3. | 50HB260 | 93 to −50 | 93 to −50 | 56 to −50 |
| 4. | 50HB400 | 93 to −49 | 69 to −50 | 43 to −50 |
| 5. | 50HB660 | 50 to −50 | 40 to −50 | 30 to −50 |
| 6. | 25HB530 | 93 to −5 | 58 to −50 | 37 to −50 |
| 7. | 50HB500 blend (30/70 v/v 50HB260/ 50HB660) | 93 to −50 | 67 to −50 | 39 to −50 |
| 8. | 510SUS blend (50/50 v/v 50HB500/ LB525**) | 93 to −50 | 52 to −50 | 31 to −50 |

*Key for determining lubricant:
50HM350: "50" = 50/50 wt. % polyoxyethylene/polyoxypropylene; "H" = hydrophillic "M" = methanol - initiated polymer; "350" = 350SUS viscosity at 100° F.;
75HB350: "75" = 75 wt. % polyoxyethylene; B = butanol - initiated polymer; etc.
**No first number = 0% polyoxyethylene; "L" = lipophyllic

TABLE II

Solubility of HFC-134a with 50HB500*
(Test range: 93 to −50° C.)

| Expt. No. | Wt. % HFC in HFC/Lubricant Mix | Miscible Range (°C.) |
|---|---|---|
| 9. | 30 | 93 to −50 |
| 10. | 40 | 93 to −50 |
| 11. | 60 | 55 to −50 |
| 12. | 90 | 42 to −50 |
| 13. | 94 | 45 to −50 |
| 14. | 98 | 50 to −50 |
| 15. | 99 | 60 to −50 |

*50HB500: "50" = 50/50 wt. % polyoxyethylene/polyoxypropylene "H" = hydrophillic "B" = butanol - initiated polymer "500" = 500 SUS viscosity at 100° F.

TABLE III

Solubility of HFC-134a with Mono-Functional PAG's
Containing No Ethylene Oxide Units
(Test Range: 93 to −50° C.)

| Expt. No. | Lubricant* | Wt. % HFC in HFC/Oil Mix | Miscible Range (°C.) |
|---|---|---|---|
| Control A | LB-165** | 30,60 | 93 to −50 |
| | | 70 | 80 to −50 |
| | | 73,90 | 73 to −50 |
| | | 94 | 68 to −50 |
| Control B | LB-285** | 60 | 78 to −50 |
| | | 80 | 40 to −50 |
| | | 94 | 53 to −50 |
| | | 97 | 58 to −50 |
| | | 99 | 58 to −50 |
| Control C | LB-525** | 30 | 40 to −50 |
| | | 60 | 36 to −40 |
| | | 90 | −7 to −23 |

*Key for determining lubricant
L = lipophyllic
B = butanol - initiated polymer
no first number = 0% ethylene oxide units or 100% propylene oxide units
165,285 and 525 = SUS viscosity at 100° F.
**Manufactured by Union Carbide Corporation

TABLE IV

Solubility of HFC-134a with PAG's
Containing Less Than One Functional OH Group
(Test Range: 93 to −50° C.)

| Expt. No. | Oil | Miscible Range (°C.) for Shown Concs. of HFC in Oil (Wt. %) | | |
|---|---|---|---|---|
| | | 30% | 60% | 90% |
| Control D | 50HG300 (+3 acetoxy caps)* | 93 to −10 | 93 to −10 | 67 to −50 |
| Control E | 50H400 (+2 acetoxy caps)** | 93 to −10 | 93 to −10 | 53 to −50 |
| Control F | 50HB400 (+1 acetoxy cap)*** | 93 to −10 | 25 to −50 | 25 to −50 |
| Control G | 50HB500 (+0.5 butyl cap)*** | Insoluble | Insoluble | Insoluble |
| Control H | 50HB500 (+0.91 methyl cap)*** | 93 to 45 | 93 to 45 | Insoluble |
| Control I | 50HB500 (+0.95 methyl cap)*** | 93 to 50 | 93 to 75 | Insoluble |

*50HG300 (+3 acetoxy caps) key:
50 = 50/50 wt. % polyoxyethylene/polypropylene
H = hydrophyllic
G = PAG initiated with glycerol
300 = 300 SUS viscosity at 100° F.
3 acetoxy caps = the 3 OH groups were capped with the acetoxy group from acetic anhydride
**Polymer initiated with diethylene glycol
***Polymer initiated with butanol

TABLE V

Solubility of HFC-134a with
Polyoxypropylene Diols
(Test Range: 93 to −50° C.)

| Expt. No. | Oil | Viscosity at 100° F. (SUS) | Wt. % HFC-134a | Miscible Range (°C.) |
|---|---|---|---|---|
| Control J | Polyoxy-propylene diol* | 554 | 30 | 93 to −50 |
| | | | 60 | 90 to −50 |
| | | | 90 | 31 to −50 |
| Control K | Polyoxy-propylene | 154 | 30 | 93 to −5 |
| | | | 60 | 45 to −38 |

TABLE V-continued

Solubility of HFC-134a with Polyoxypropylene Diols
(Test Range: 93 to −50° C.)

| Expt. No. | Oil | Viscosity at 100° F. (SUS) | Wt. % HFC-134a | Miscible Range (°C.) |
|---|---|---|---|---|
| | diol** | | 90 | 93 to −50 |

*Manufactured by CPI Engineering Co.
**"Niax PPG-425" manufactured by Union Carbide Corp.

TABLE VI

Solubility of HFC-134a with PAG's Containing Three Functional OH Groups
(Test Range: 93 to −50° C.)

| Expt. No. | Oil | Viscosity at 100° F. (SUS) | Wt. % HFC-134a | Miscible Range (°C.) |
|---|---|---|---|---|
| Control L | 50HG400* | 400 | 30 | 93 to 25 |
| | | | 60 | 25 to 5 |
| | | | 90 | 25 to −50 |
| Control M | 50HG450* | 450 | 30 | 25 to −50 |
| | | | 60 | 25 to −50 |
| | | | 90 | 20 to −50 |
| Control N | 100HG550* | 550 | 30 | 24 to −40 |
| | | | 60 | Insoluble |
| | | | 90 | Insoluble |
| Control O | | 562 | 30 | Insoluble |
| $CH_3C(CH_2OCH_2CH_2-$ | | | 60 | Insoluble |
| $-OCH_2CH_2OH)_3$ | | | 90 | Insoluble |

*G = Glycerol-initiated polymer

TABLE VII

Solubility of HFC 134a with Available Miscellaneous Refrigerant Oils
(Test Range: 93 to −50° C. unless noted otherwise)

| Expt. No. | Oil | Miscible Range (°C.) for Indicated Concentration (Wt %) of HFC-134a In Lubricant | | |
|---|---|---|---|---|
| | | 30% | 60% | 90% |
| | Dipentaerythritol Esters of Fatty Acids (c) | | | |
| Control P | 240 SUS | −50+ | −4+ | 40+ |
| Control Q | 290 SUS | −44+ | −17+ | 70+ |
| | PEG Esters of Fatty Acids (d) | | | |
| Control R | 144 SUS | −21+ | 54(a) | 54(a) |
| Control S | 620 SUS | −4+ | 4+ | 70+ |
| Control T | 830 SUS | −6+ | 70+ | 70+ |
| | Napthenic Oils (e) | | | |
| Control U | Suniso® 5GS (500 SUS, 38% aromatic) | 54(a) | 54(a) | 54(a) |
| Control V | Witco 500 (500 SUS) | 54(a) | 54(a) | 54(a) |
| Control W | Expt. Oil (520 SUS, 47% aromatic) | 54(a) | 54(a) | 54(a) |
| Control X | Expt. Oil (529 SUS, 75% aromatic) | 54(a) | 54(a) | 54(a) |
| | Paraffin Oil (f) | | | |
| Control Y | BVM-100N (500 SUS) | 54(a) | 54(a) | 54(a) |
| | Alkyl Benzene | | | |
| Control Z | Zerol 300 (300 SUS) (g) | 54(a) | 54(a) | 54(a) |
| Control A' | DN600 (125 SUS) (b) | 54(a) | 54(a) | 54(a) |
| Control B' | Atmos HAB15F (78 SUS) (i) | 55+ | Ins(b) | Ins(b) |
| | Silicone Oils | | | |
| Controls C',D',E' | L-45 Oils (163, 231, & 462 SUS) (j) | Ins(b) | Ins(b) | Ins(b) |

\+ - Soluble at and above shown temperature.
a - May be soluble above shown temperature.
b - Completely insoluble from 93 to −50° C.
c - Hercules
d - CPI Engineering
e - Witco Chemical Co.
f - BVM Associates
g - Shrieve Chemical Co.
h - Conoco
i - Nippon Oil KK
j - Union Carbide

TABLE VIII

Stability of HFC-134a in Contact With Lubricant Plus Coupled Steel-1010/Copper/Aluminum-1100 at 268° F. for 11.8 days

| Expt. No. | Refrigerant | Lubricant | $Cl^-$ vs. $F^{-*}$ Generated (ppm) | Visual-Effect Rating | | | |
|---|---|---|---|---|---|---|---|
| | | | | Liquid | Steel | Cu | Al |
| 16. | HFC-134a | 50HB500 | <0.2* | 0 | 0 | 0 | 0 |
| 17. | HFC-134a | 50HB260 | <0.2* | 0 | 0 | 0 | 0 |
| Control F' | CFC-12 | Naphthenic Oil | 423 | 4 | 3 | 2 | 2 |
| Control G' | CFC-12 | Paraffinic Oil | — | 0 | 3 | 0 | 0 |
| Control H' | CFC-12 | Witco 500 | 32 | 0 | 1 | 0 | 0 |

*No HFC-134a decomposed.
a - Key to ratings -

| Rating | Visual Changes |
|---|---|
| 0 | None |
| 1 | Slight, acceptable change Steel-Tarnished |
| 2 | Borderline change Cu - dark tarnish plus moderate corrosion - 25% of surface Al - etched |
| 3 | Slight unacceptable change Steel - brown deposit/gray film - 100% of surface |
| 4 | Moderate, unacceptable change |

TABLE VIII-continued

Stability of HFC-134a in Contact With
Lubricant Plus Coupled Steel-1010/Copper/Aluminum-1100
at 268° F. for 11.8 days

| Expt. No. | Refrigerant | Lubricant | $Cl^-$ vs. $F^-$* Generated (ppm) | Visual-Effect Rating Liquid | Steel | Cu | Al |
|---|---|---|---|---|---|---|---|
| | | | Liquid - clear brown plus black precipitate | | | | |

TABLE IX

Solubility of HFC-134a with PAG Lubricant and
Containing Extreme Pressure (EP) Additives
(Test Range 93 to −50° C.)

| Expt. No. | Lubricant | Additive* | 30% | 60% | 90% |
|---|---|---|---|---|---|
| 18 | 50HB500 | 0 | 93 to −50 | 55 to −50 | 42 to −50 |
| 19 | " | 1 | 93 to −50 | 65 to −50 | 40 to −50 |
| 20 | " | 2 | 93 to −50 | 65 to −50 | 38 to −50 |
| 21 | " | 3 | 93 to −10 | 65 to −50 | 38 to −50 |
| 22 | 50HB260 | 0 | 93 to −10 | 63 to −50 | 56 to −50 |
| 23 | " | 1 | 93 to −50 | 93 to −50 | 48 to −50 |
| 24 | " | 2 | 93 to −50 | 93 to −50 | 48 to −50 |
| 25 | " | 3 | 93 to −20 | 73 to −50 | 50 to −50 |

*EP Additive key:
0 = none;
1 = 0.6 wt. % "MLX-788" a three-component additive from Union Carbide;
2 = 1.3 wt. % "SYN-O-AD 8478," butylated triphenyl phosphate/triphenylphosphate from Stauffer Chemical;
3 = 0.1 wt. % "Lubrizol 1097," zinc dialkyl dithio-phosphate from Lubrizoil Corporation

TABLE X

Lubricity of Lubricants Under One Atmosphere of
Refrigerant Gas Pressure in a Four-Ball Wear Test

| Expt. No. | Refrigerant | Lubricant | Ball Scar Wear* (mm)(a) | Coefficient* of Friction(b) |
|---|---|---|---|---|
| 26 | HFC-134a | 50HB500 | 0.303 | 0.023 |
| 27 | HFC-134a | 50HB500 plus EP additive ("MLX-788") | 0.357 | 0.030 |
| Control I' | CFC-12 | Naphthenic Oil | 0.373 | 0.072 |
| Control J' | CFC-12 | Paraffinic Oil | 0.368 | 0.071 | a ± 0.028 std. deviation
b ± 0.006 std. deviation
*the smaller the number, the better

TABLE XI

Load-Carrying Ability of Lubricants
Under One Atmosphere of Refrigerant
Gas Pressure in Falex Pin/V-Block Test

| Expt. No. | Refrigerant Gas | Lubricant | Fail Load* (lbs.) | Torque at Fail* (in-lbs.) |
|---|---|---|---|---|
| 28 | HFC-134a | 50HB500 | 1750 | 28 |
| 29 | HFC-134a | 50HB500 plus EP additive ("MLX-788") | 4150 | 46 |
| Control K' | CFC-12 | Naphthenic Oil | 1250 | 24 |
| Control L' | CFC-12 | Paraffinic Oil | 1300 | 26 |

*The larger the number, the better.

What is claimed is:

1. A composition for use in compression refrigeration comprising:
   (a) at least one compound selected from the group consisting of a tetrafluoroethane and pentafluoroethane; and
   (b) a sufficient amount to provide lubrication of at least one random polyoxyalkylene glycol which is mono-functional with respect to hydroxyl groups and based on 25% to 75% ethylene oxide and 75% to 25% propylene oxide, having an SUS viscosity at 100° F. of 100 to 1200 and being miscible in combination with component (a) in the range of temperatures from −40° C. to at least +20° C.

2. The composition of claim 1 wherein said tetrafluoroethane is 1,1,1,2-tetrafluoroethane.

3. The composition of claim 1 wherein said tetrafluoroethane is 1,1,2,2-tetrafluoroethane.

4. The composition of claim 1 wherein component (a) is pentafluoroethane.

5. The composition of claim 1 wherein said mono-functional polyalkylene glycol has been prepared using at least one initiator selected from the group consisting of methanol, ethanol, propanol and butanol.

6. The composition of claim 1 wherein the SUS viscosity at 100° F. of said mono-functional polyalkylene glycol is from 400 to 1000.

7. The composition of claim 1 wherein said polyalkylene glycol comprises 1–99% by weight of said composition.

8. The composition of claim 1 further comprising component (c) selected from the group consisting of (1) an extreme pressure additive, (2) an oxidation and thermal stability improver and (3) a corrosion inhibitor.

9. The composition of claim 8 comprising 0.1–1.3% by weight of an extreme pressure additive.

10. A composition for use in compression refrigeration comprising:
    (a) 1,1,1,2-tetrafluoroethane; and
    (b) a sufficient amount to provide lubrication of at least one random polyoxyalkylene glycol which is mono-functional with respect to hydroxyl groups and based on 40–60% ethylene oxide and, correspondingly, 60–40% propylene oxide prepared using a butanol initiator, having an SUS viscosity at 100° F. of about 500 and being miscible in combination with component (a) in the temperature range from −50° C. to at least −40° C.

11. A method for improving lubrication in compression refrigeration equipment using tetrafluoroethane as the refrigerant consisting essentially of using 1–99% by weight of the combination with said tetrafluoroethane of at least one random mono-functional polyalkylene glycol based on 25%–75% ethylene oxide and, correspondingly, 75%–25% propylene oxide and having an SUS viscosity at 100° F. of 100 to 1200.

12. A method for improving lubrication in compression refrigeration equipment using tetrafluoroethane as the refrigerant consisting essentially of using 10–50% by volume of the combination with said tetrafluoroethane of at least one random mono-functional polyalkylene glycol based on 25%–75% ethylene oxide and, correspondingly, 75%–25% propylene oxide and having an SUS viscosity at 100° F. of 400 to 1000.

13. The method of claim 11 wherein said polyalkylene glycol is based on about 50% ethylene oxide units and about 50% propylene oxide units and has an SUS viscosity of about 500° at 100° F.

* * * * *

UNITED STATES PATENT AND TRADEMARK OFFICE
CERTIFICATE OF CORRECTION

PATENT NO. : 4,971,712

DATED : November 20, 1990

INVENTOR(S) : Robert A. Gorski, et al.

It is certified that error appears in the above—identified patent and that said Letters Patent is hereby corrected as shown below:

Column 4, line 40,
    delete "<20°C"; substitute therefor --<-20°C--.

Column 12, line 48;

Claim 10, line 12,
    delete "-40°C"; substitute therefor --+40° C--.

Column 12, line 68;
Claim 13, line 4,
    delete "500°"; substitute therefor --500--.

Signed and Sealed this

Twenty-sixth Day of May, 1992

*Attest:*

DOUGLAS B. COMER

*Attesting Officer*      *Acting Commissioner of Patents and Trademarks*